US011136896B2

(12) United States Patent
Benjamin

(10) Patent No.: US 11,136,896 B2
(45) Date of Patent: Oct. 5, 2021

(54) ROTATING LEAF SPRING SEAL

(71) Applicant: UNITED TECHNOLOGIES CORPORATION, Farmington, CT (US)

(72) Inventor: Daniel Benjamin, Simsbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 128 days.

(21) Appl. No.: 16/392,953

(22) Filed: Apr. 24, 2019

(65) Prior Publication Data
US 2020/0340369 A1 Oct. 29, 2020

(51) Int. Cl.
*F01D 11/00* (2006.01)
*F16J 15/3292* (2016.01)

(52) U.S. Cl.
CPC ......... *F01D 11/003* (2013.01); *F16J 15/3292* (2013.01); *F05D 2220/32* (2013.01); *F05D 2230/60* (2013.01); *F05D 2240/57* (2013.01); *F05D 2260/38* (2013.01); *F16F 2230/30* (2013.01); *F16F 2232/02* (2013.01)

(58) Field of Classification Search
CPC ............... F01D 11/003; F05D 2220/32; F05D 2230/60; F05D 2240/57; F05D 2240/55; F16J 15/54; F16J 15/16; F16F 2260/30; F16F 2232/02
See application file for complete search history.

(56) References Cited

U.S. PATENT DOCUMENTS

| | | |
|---|---|---|
| 6,116,612 A | 9/2000 | Halliwell et al. |
| 6,402,466 B1 | 6/2002 | Burdgick et al. |
| 6,527,274 B2 | 3/2003 | Herron et al. |
| 6,648,592 B2 | 11/2003 | Escure et al. |
| 7,344,354 B2 | 3/2008 | Lammas et al. |
| 7,578,509 B2 | 8/2009 | Grondahl |
| 8,075,254 B2 | 12/2011 | Morgan et al. |
| 8,939,710 B2 * | 1/2015 | Webb ..................... F16J 15/164 415/111 |
| 8,956,120 B2 | 2/2015 | Giametta |
| 2017/0089211 A1 * | 3/2017 | Broomer ............... F01D 11/005 |
| 2018/0100585 A1 * | 4/2018 | Bertini ................. F16J 15/3212 |

FOREIGN PATENT DOCUMENTS

JP H06346703 12/1994

OTHER PUBLICATIONS

European Patent Office, European Search Report dated Sep. 11, 2020 in Application No. 20171287.4.

* cited by examiner

*Primary Examiner* — Woody A Lee, Jr.
*Assistant Examiner* — Maxime M Adjagbe
(74) *Attorney, Agent, or Firm* — Snell & Wilmer L.L.P.

(57) ABSTRACT

A rotating leaf spring seal is disclosed. In various embodiments, the rotating leaf spring seal includes a first annular ring configured for positioning against a support structure; a hook section having an outer surface configured for sealing engagement with a tie shaft and an inner surface configured for receiving a hold down ring; and a spring section disposed between the first annular ring and the hook section.

14 Claims, 7 Drawing Sheets

ROTATING LEAF SPRING SEAL

FIELD

The present disclosure relates generally to gas turbine engines and, more particularly, to seal assemblies used within gas turbine engines.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, where energy is extracted from the hot combustion gases to power the compressor section, the fan section and various other loads occurring within or proximate a gas turbine engine.

Various seal assemblies, such as, for example, seal rings (or piston ring seals) may be used in a variety of applications within a gas turbine engine to provide a fluidic seal between fluids at different pressures and temperatures. Static, non-rotating seal rings, for example, are typically seated by a pressure differential (e.g., the pressure difference between one side of the seal and the other) to create a face seal. Such seal rings are, however, not generally optimal or practical because they are unable to accommodate relatively large radial gap variations during operation, require overlapping members to maintain proper position, or permit more leakage than is otherwise desirable. Rotating seal rings, on the other hand, may be subject to significant centrifugal loading given the high rotational speeds that which gas turbine engines may operate and, as such, typically experience more complex operational conditions and greater stresses and loads than static, non-rotating seal rings may be subject.

SUMMARY

A rotating leaf spring seal is disclosed. In various embodiments, the rotating leaf spring seal includes a first annular ring configured for positioning against a support structure; a hook section having an outer surface configured for sealing engagement with a tie shaft and an inner surface configured for receiving a hold down ring; and a spring section disposed between the first annular ring and the hook section.

In various embodiments, the spring section includes a first spring portion and a second spring portion disposed radially inward of the first annular ring. In various embodiments, the first spring portion includes a second annular ring. In various embodiments, the second spring portion includes a third annular ring connected to the second annular ring at a flex point that extends circumferentially about a longitudinal axis.

In various embodiments, the second annular ring and the third annular ring are disposed at an angle having a vertex at the flex point. In various embodiments, the angle defines a range from about thirty degrees to about sixty degrees. In various embodiments, the second annular ring is substantially parallel to the first annular ring. In various embodiments, the first annular ring is connected to the second annular ring by an annular wall.

In various embodiments, the outer surface of the hook section includes at least one of a curved surface, a flat surface or an undulating surface configured for sealing engagement with the tie shaft. In various embodiments, the outer surface of the hook section is configured for sealing engagement with a wear pad extending radially outward of the tie shaft.

In various embodiments, the support structure is an annular member configured to support an anti-vortex tube. In various embodiments, the support structure comprises a first arm extending from a first rotor. In various embodiments, the support structure comprises a second arm extending from a second rotor. In various embodiments, the first annular ring includes an orifice configured to provide a passage for cooling air to flow to a region downstream of the rotating leaf spring seal. In various embodiments, an anti-rotation peg extends radially outward of the first annular ring and configured to engage with the support structure.

A compressor for a gas turbine engine is disclosed. In various embodiments, the compressor includes a first rotor; a second rotor disposed downstream of the first rotor; and a rotating leaf spring seal disposed between the first rotor and the second rotor, the rotating leaf spring seal including a first annular ring configured for positioning against a support structure connected to at least one of the first rotor and the second rotor, a hook section having an outer surface configured for sealing engagement with a tie shaft and an inner surface configured for receiving a hold down ring, and a spring section disposed between the first annular ring and the hook section.

In various embodiments, the spring section includes a first spring portion and a second spring portion disposed radially inward of the first annular ring, the first spring portion including a second annular ring and the second spring portion including a third annular ring connected to the second annular ring at a flex point that extends circumferentially about a longitudinal axis. In various embodiments, the outer surface of the hook section includes at least one of a curved surface, a flat surface or an undulating surface configured for sealing engagement with a wear pad extending radially outward of the tie shaft.

A method of assembling a rotating leaf spring seal within a compressor section of a gas turbine engine is disclosed. In various embodiments, the method includes the steps of assembling a rotor stack having N upstream rotors; positioning the rotating leaf spring seal radially inward of a support structure either connected to or extending from an Nth rotor; and installing a hold down ring within a hook section of the rotating leaf spring seal.

In various embodiments, the step of positioning the rotating leaf spring seal radially inward of the support structure includes compressing the rotating leaf spring seal radially inward against a spring action of a spring section of the rotating leaf spring seal and the step of installing the hold down ring includes manipulation of a free end of the hook section while urging the hold down ring onto an inner surface of the hook section.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
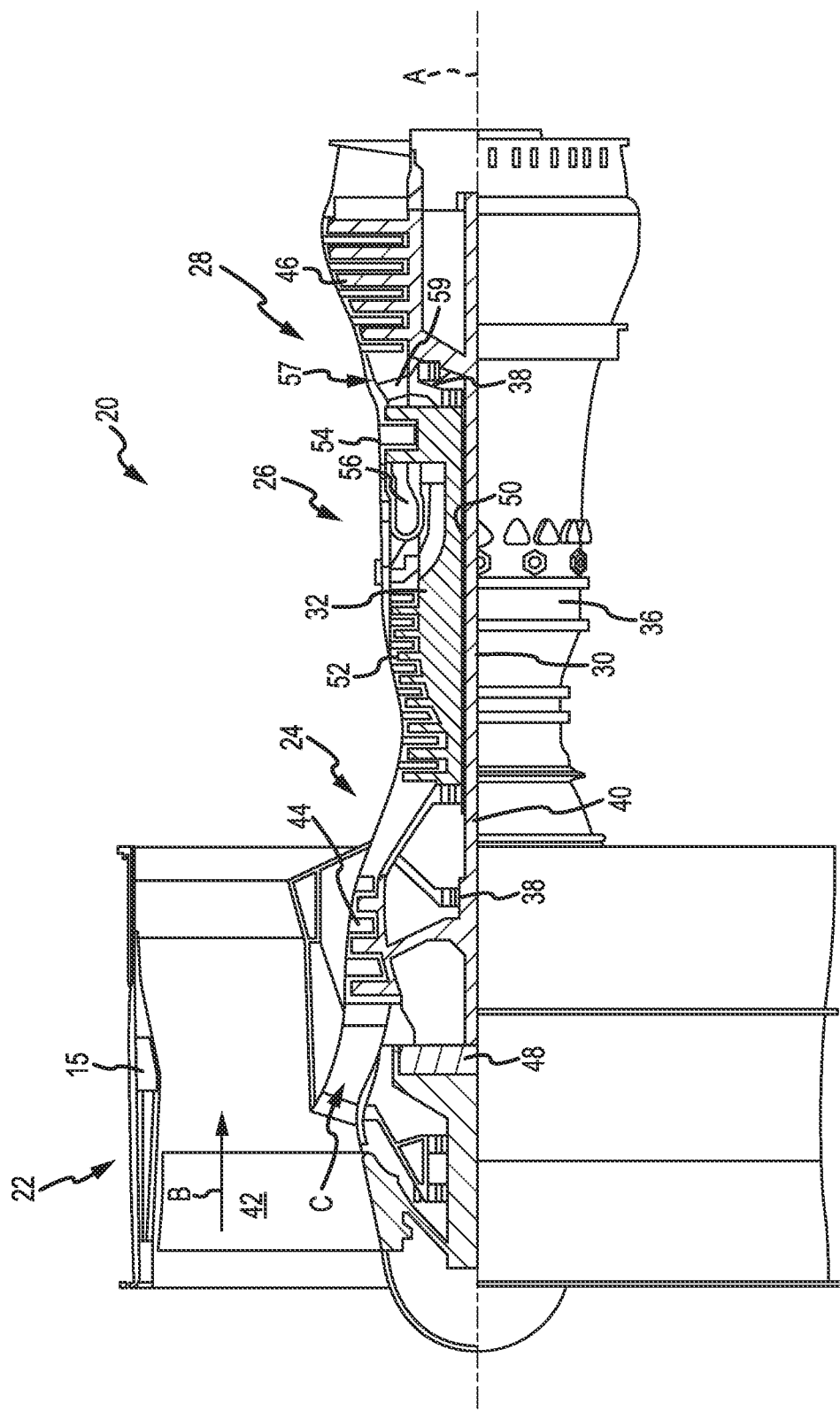
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A (with the arrow pointing in the aft direction) relative to an engine static structure 36 via several bearing systems 38. Various bearing systems at various locations may alternatively or additionally be provided and the location of the several bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2A:
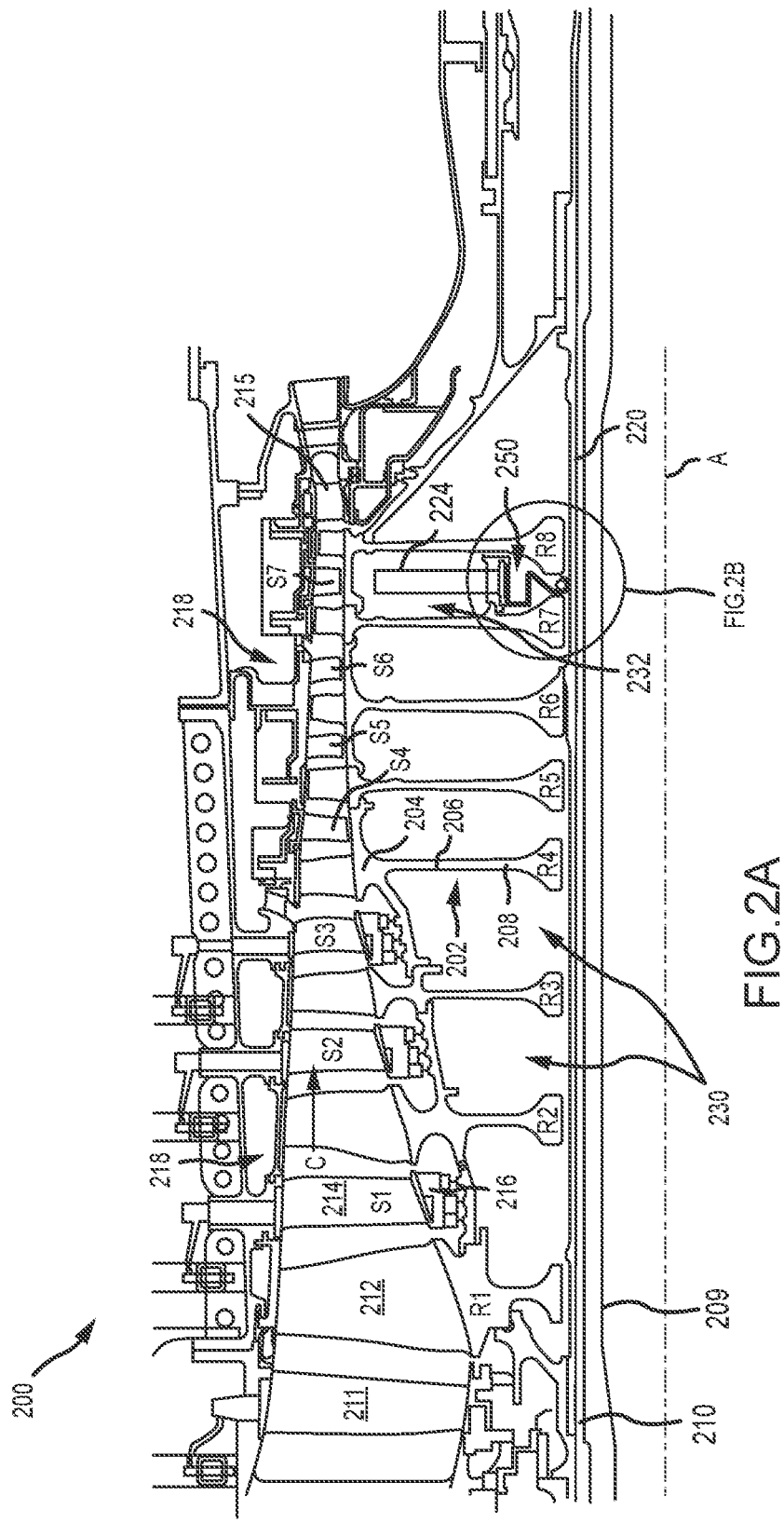
FIG. 2A is a schematic views of a high pressure compressor section of a gas turbine engine, in accordance with various embodiments.

Referring now to FIG. 2A, a section of a compressor is illustrated, according to various embodiments, such as a high-pressure compressor 200 of a gas turbine engine. The high-pressure compressor 200 includes a plurality of rotors 202 (e.g., rotors R1-R8), each having a rim 204, a disk 206 and a bore 208. In various embodiments, each of the plurality of rotors 202 is disposed on or connected to a high speed spool 210 configured to rotate about an engine central longitudinal axis A (with the arrow pointing in the aft direction). A tie shaft 220 axially couples the plurality of rotors 202 and prevents them from separating along the engine central longitudinal axis. A rotor blade 212 is secured to the rim 204 of each of the plurality of rotors 202, while a vane 214 is disposed between adjacent pairs of rotor blades. A vane inner shroud 216 may be positioned radially inward of each vane 214. A plurality of stators (e.g., stators S1-S7) is formed by each vane 214 and its corresponding vane inner shroud 216. An alternating series of vane inner shroud 216 sections and rim 204 sections forms an inner diameter of a core flow path C. An outer casing 218 forms an outer diameter of the core flow path C. In various embodiments, the outer casing 218, together with each vane 214 and vane inner shroud 216 section, form a stationary structure, while the plurality of rotors 202 and each rotor blade 212 form a rotating structure. In various embodiments, the high-pressure compressor 200 may further include a plurality of inlet guide vanes 211 positioned upstream of rotor R1 and a plurality of exhaust guide vanes 215, positioned downstream of rotor R8.

Air in the core flow path C traverses from left to right in FIG. 2A and increases in pressure and temperature at each stage of the high-pressure compressor 200, ultimately exiting the high-pressure compressor 200 by passing the plurality of exhaust guide vanes 215 after passing the blades connected to rotor R8. Significant variations in thermal energy and pressure levels at successively higher stages of the high-pressure compressor 200 may occur, particularly within the latter stages of the high-pressure compressor 200—e.g., in the proximity of the rim sections of rotors R7 and R8. In various embodiments, therefore, a rotating leaf spring seal 250 (or a rotating leaf spring seal assembly) may be disposed between the rotors R7 and R8 (or between a first rotor and a second rotor) to provide a fluidic seal between a low-pressure cooling air flowing within an upstream section 230 (or forward cavity) and a high-pressure cooling fluid flowing within a downstream section 232 (or aft cavity) of the high-pressure compressor 200.

Without loss of generality, in various embodiments, the upstream section 230 may comprise an upstream cavity defined by rotors R1-R6, radially inward of the inner diameter of the core flow path C, while the downstream section 232 may comprise a downstream cavity defined by rotors R7 and R8, radially inward of the inner diameter of the core flow path C. In various embodiments, the upstream section 230 may be thermally conditioned using a low-pressure bleed air introduced from a corresponding low-pressure section of the core flow path C, after which the low-pressure bleed air exits the upstream section 230 via radial holes disposed in the tie shaft 220 proximate rotor R6, where it may then mix with an inter-shaft air flow, flowing between the tie shaft 220 and a low speed spool 209, for subsequent delivery to a low-pressure turbine section downstream of the high-pressure compressor 200. Similarly, the downstream section 232 may be thermally conditioned using a high-pressure bleed air introduced from a corresponding high-pressure section of the core flow path C and, in various embodiments, routed through an anti-vortex tube 224 (or a plurality of anti-vortex tubes spaced circumferentially about the cavity between rotors R7 and R8), for subsequent delivery to a high-pressure turbine section. The rotating leaf spring seal 250 prevents cross contamination between the low-pressure cooling air flowing within the upstream section 230 (or forward cavity) and the high-pressure cooling fluid flowing within the downstream section 232 (or aft cavity) of the high-pressure compressor 200.

Figure 2B:
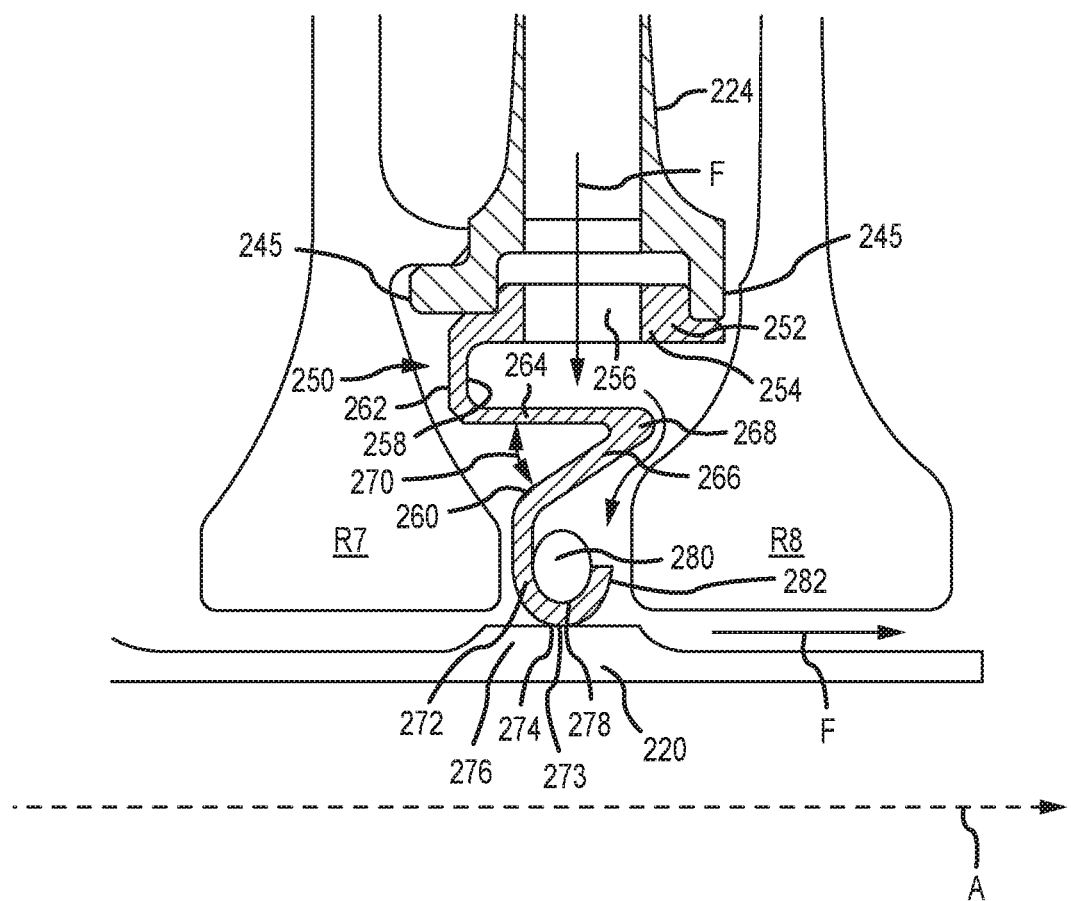
FIG. 2B is an expanded view of a rotating leaf spring seal disposed between a pair of rotors within the high pressure compressor section illustrated in FIG. 2A, in accordance with various embodiments.
Figure 2C:
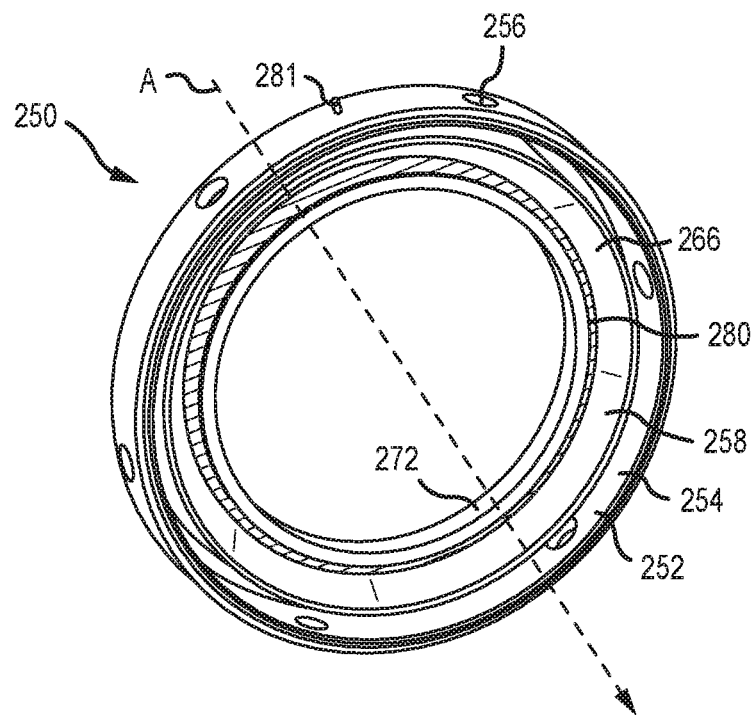
FIGS. 2C and 2D are perspective schematic views of the rotating leaf spring seal illustrated in FIGS. 2A and 2B, in accordance with various embodiments.
Figure 2D:
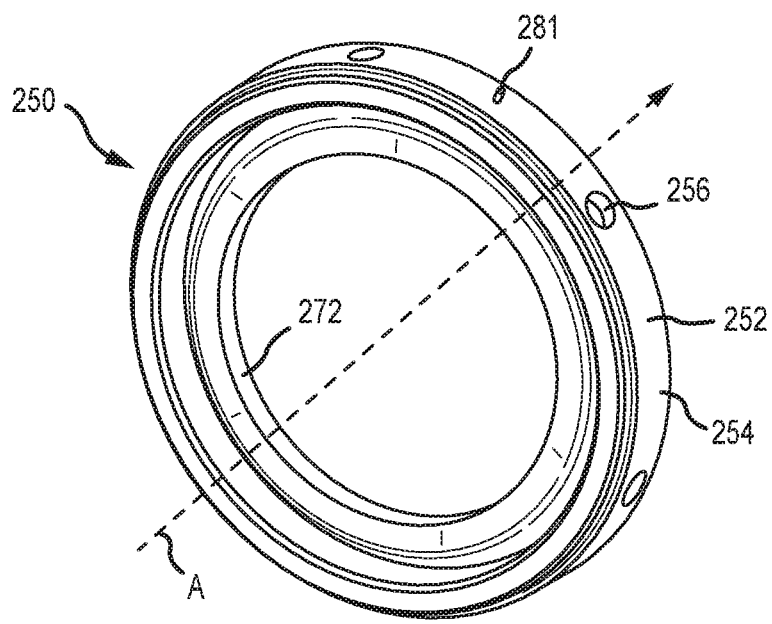

Referring now to FIGS. 2B, 2C, and 2D, expanded views of the rotating leaf spring seal 250 are provided, with reference to the engine central longitudinal axis A (with the arrow pointing in the aft direction). In various embodiments, the rotating leaf spring seal 250 includes a radially outer portion 252 configured to engage with a support structure, such as, for example, a support structure (e.g., an annular member 245) for the anti-vortex tube 224 (or a plurality of anti-vortex tubes spaced circumferentially about the annular member 245 or the engine central longitudinal axis A). As illustrated in FIGS. 2C and 2D, the radially outer portion may comprise an annular ring 254 (or a first annular ring) having an orifice 256 (or a plurality of orifices) extending through the annular ring 254, thereby providing a passage for a high-pressure cooling air F to flow to a region downstream of the rotating leaf spring seal 250. For example, in various embodiments, the high-pressure cooling air flows from the orifice 256, around a downstream side 258 of the rotating leaf spring seal 250 and then to locations downstream of the rotor R8, such as, for example, a high-pressure turbine section. In various embodiments, the orifice 256 is in alignment and configured to interface with the anti-vortex tube 224 in order to provide the passage for the high-pressure cooling air F to flow as described above.

A spring section 260 (or a leaf spring section) is positioned radially inward of the annular ring 254. In various embodiments, the spring section 260 is connected to the annular ring 254 by an annular wall 262 that extends radially (or substantially radially) between the annular ring 254 and a first spring portion 264 of the spring section 260. In various embodiments, the first spring portion 264 of the spring section 260 comprises an annular ring (or a second annular ring) disposed radially inward of and substantially parallel to the annular ring 254 or the radially outer portion 252. A second spring portion 266 is connected to the first spring portion 264 at a flex point 268 that also extends circumferentially about the engine central longitudinal axis A. In various embodiments, the second spring portion 266 comprises an annular ring (or a third annular ring) that is disposed at an angle 270 with respect to the first spring portion 264, the angle 270 defining a vertex at the flex point 268. In various embodiments, the angle 270 is within a range of about thirty degrees (30°) to about sixty degrees (60°); in various embodiments, the angle 270 is within a range of about forty degrees (40°) to about fifty degrees (50°); and in various embodiments, the angle 270 is about forty-five degrees (45°). A tolerance of ten degrees (e.g., ±10°) is contemplated for the indicated ranges.

A hook section 272 is connected to the second spring portion 266 and forms an annular hook defining an outer surface 274 configured for sealing engagement with a wear pad 276 of the tie shaft 220. In various embodiments, the outer surface defines a contact portion 273 that is generally curved and configured for sealing engagement with the wear pad 276 at a point or region where the curved surface of the outer surface 274 makes contact with the wear pad 276. The hook section 272 also defines an inner surface 278 configured to receive a hold down ring 280 and a free end 282 configured to manipulate (e.g., be radially inward) the hook section 272 to facilitate installation of the hold down ring 280. In various embodiments, the hold down ring 280 is configured to exert a radially inward force against the hook section 272 and to maintain sealing engagement of the outer surface 274 against the wear pad 276. The hold down ring 280 is also configured, in various embodiments, to counter expansion of the tie shaft 220, or the wear pad 276 of the tie shaft 220, in the radial direction due to thermal loads during operation. Generally, the hold down ring 280 is configured to expand in the radial direction due to centrifugal forces during operation, but such radial expansion is significantly less than that experienced by the annular member 245, which is typically configured to expand in synchronization with the rotor(s), which feature considerably higher mass and a greater center of gravity. The difference in radial expansion is accommodated by flexing of the spring section 260 of the rotating leaf spring seal 250. In various embodiments, an anti-rotation peg 281 (or a plurality of anti-rotation pegs) extends radially outward from the annular ring 254 and is configured to engage an annular support structure for the anti-vortex tube 224 (or the plurality of anti-vortex tubes).

Figure 3A:
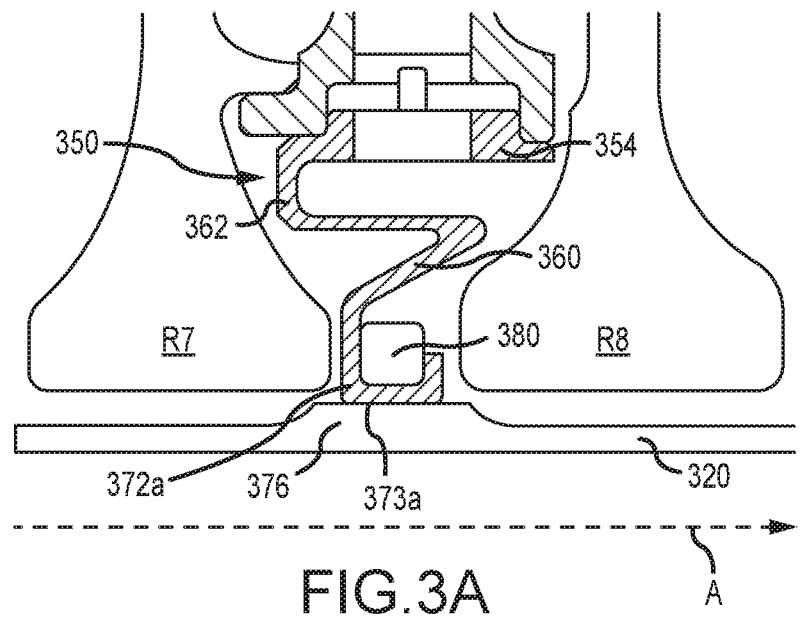
FIGS. 3A and 3B are schematic views of rotating leaf spring seals, in accordance with various embodiments.
Figure 3B:
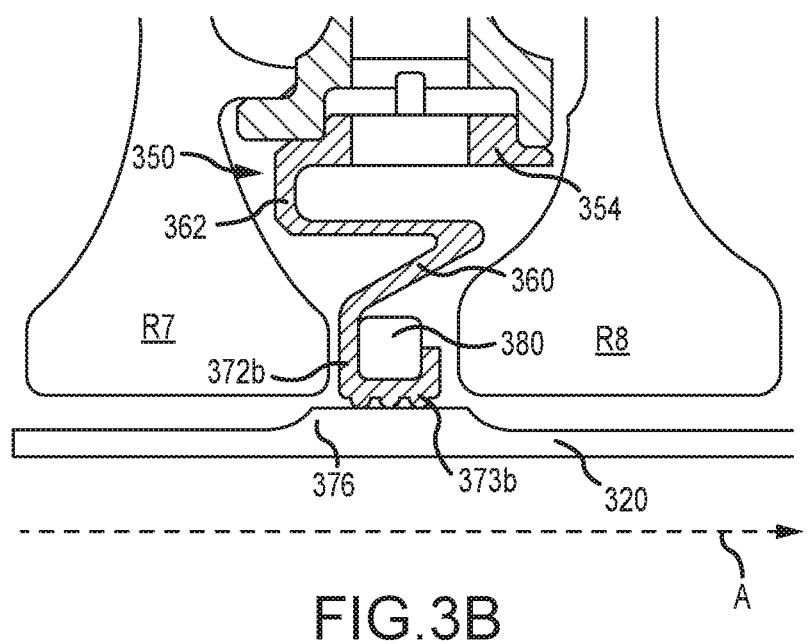

Referring now to FIGS. 3A and 3B, various embodiments of a rotating leaf spring seal 350 are illustrated disposed between rotors R7 and R8. The rotating leaf spring seal 350 includes many of the constructional and operational features of the rotating leaf spring seal 250 described above with reference to FIGS. 2A-2D. For example, the rotating leaf spring seal 350 includes an annular ring 354, an annular wall 362 and a spring section 360, similar to the annular ring 254, the annular wall 262 and the spring section 260 described above. Referring specifically to FIG. 3A, the rotating leaf spring seal 350 includes a hook section 372a having a contact portion 373a that is generally flat and configured for sealing engagement with a wear pad 376 extending radially outward of a tie shaft 320. Distinguishing the contact portion 273 described above with reference to FIG. 2B, the generally flat surface of the contact portion 373a illustrated in FIG. 3A provides additional surface area to facilitate the sealing engagement with the wear pad 376. Referring now to FIG. 3B, in various embodiments, the rotating leaf spring seal 350 includes a hook section 372b having a contact portion 373b an undulating surface having wear pegs extending radially inward (e.g., a knife edge-like surface) that is configured for sealing engagement with the wear pad 376 extending radially outward of a tie shaft 320. As illustrated in both FIGS. 3A and 3B, a hold down ring 380, similar to the hold down ring 280 described above with reference to FIG. 2B is provided and configured to exert a radially inward force against the hook section 372a (see FIG. 3A) or the hook section 372b (see FIG. 3B) and to maintain sealing engagement with the outer surface of the contact portion 373a (see FIG. 3A) or the contact portion 373b (see FIG. 3B) against the wear pad 376.

Figure 4:
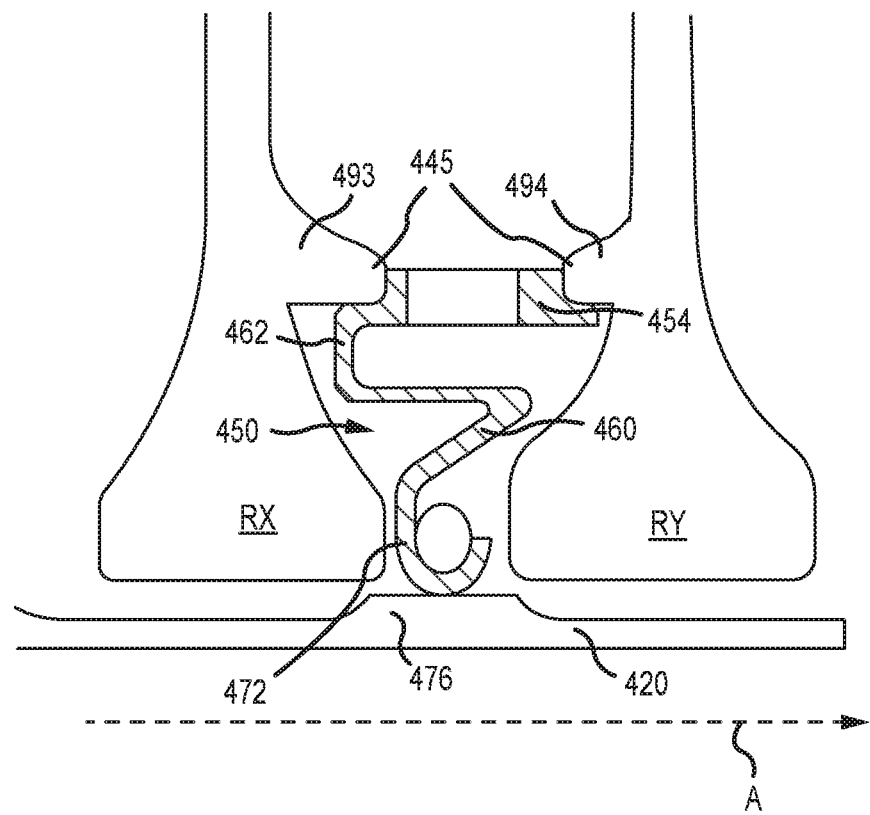
FIG. 4 is a schematic view of a rotating leaf spring seal, in accordance with various embodiments.

Referring now to FIG. 4, a rotating leaf spring seal 450 is illustrated disposed between rotors RX and RY, which may include any pair of the rotors described above with reference to FIG. 2A, such as, for example, R7 and R8. The rotating leaf spring seal 450 includes many of the constructional and operational features of the rotating leaf spring seal 250 described above with reference to FIGS. 2A-2D. For example, the rotating leaf spring seal 450 includes an annular ring 454, an annular wall 462, a spring section 460 and a hook section 472, similar to the annular ring 254, the annular wall 262, the spring section 260 and the hook section 272 described above. The hook section 472 is configured for sealing engagement with a wear pad 476 extending radially from a tie shaft 420, and may include any of the various contact portions described above with reference to FIGS. 2A-2D and FIGS. 3A and 3B. Unlike the various embodiments described above, however, the annular ring 454 is configured to engage a support structure 445 comprising, for example, a first arm 493 extending aft from rotor RX and a second arm 494 extending axially forward from rotor RY, rather than engaging a support structure for one or more anti-vortex tubes, such as, for example, the support structure (e.g., the annular member 245) for the anti-vortex tube 224 described above with reference to FIG. 2B. Further, in various embodiments, only a single arm— e.g., the first arm 493—is employed to maintain the annular ring 454 in position. Using a single arm configuration to provide a cantilevered-type support for the annular ring 454 allows placement of the rotating leaf spring seal 450 on an upstream rotor (e.g., rotor RX), thereby minimizing the temperature gradient between aft and forward sides (or upstream and downstream sides) of the rotor web and reducing pressure loss for the cooling air flow. Use of a single arm configuration may also simplify installation of the rotating leaf spring seal 450 between rotor RX and rotor RY, though using a dual arm configuration, as illustrated in FIG. 4, may facilitate reduced vibration of the otherwise free end of the annular ring 454 during operation.

Figure 5:
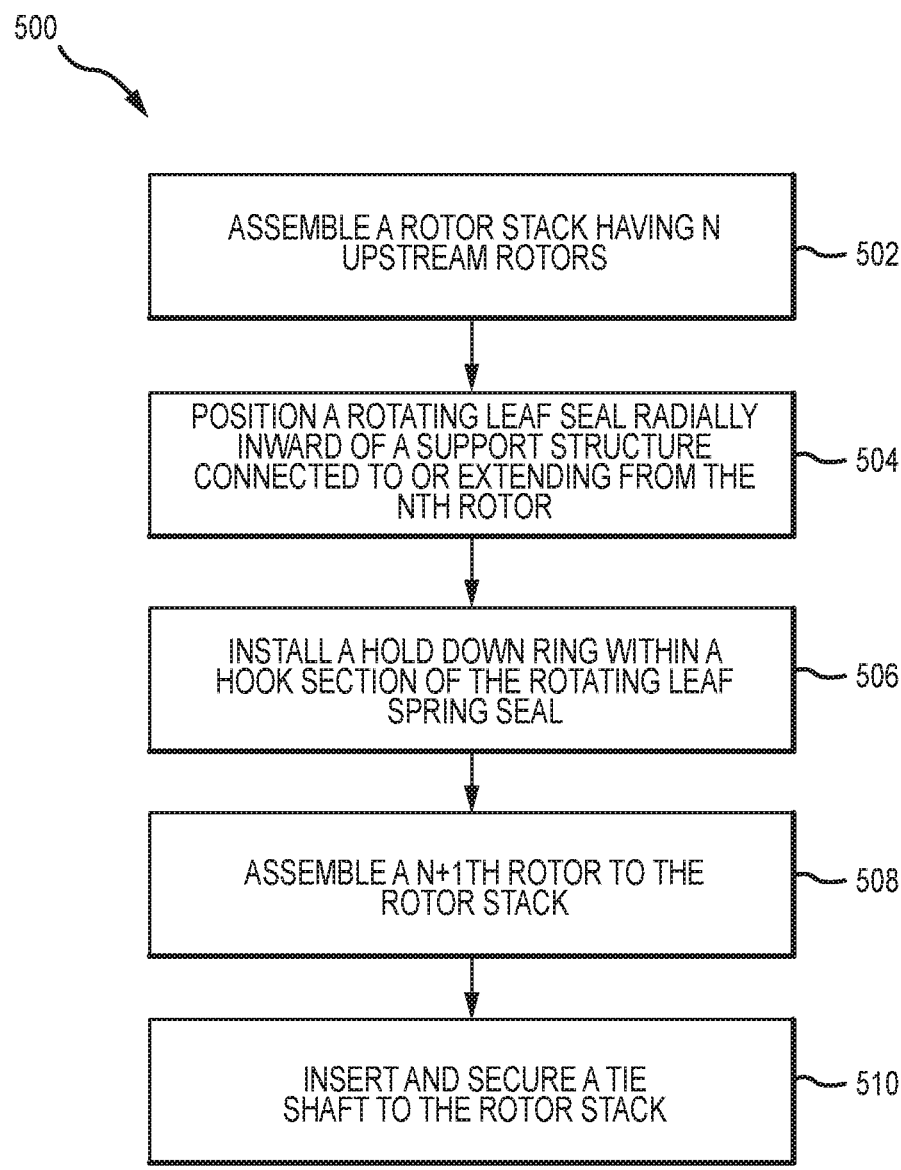
FIG. 5 describes a method of providing a seal between a first component and a second component using a rotating leaf spring seal, in accordance with various embodiments.

Referring now to FIG. 5, a method 500 of assembling a rotating leaf spring seal within a compressor section of a gas turbine engine is described. In various embodiments, a first step 502 includes assembling a rotor stack having N upstream rotors where, in various embodiments, N=7 (e.g., the Nth rotor is rotor R7 described above with reference to FIGS. 2A and 2B). A second step 504 includes positioning the rotating leaf spring seal radially inward of a support structure either connected to or extending from the Nth rotor (e.g., the support structure for an anti-vortex tube or a first arm extending from the Nth rotor). In various embodiments, the step of positioning the rotating leaf spring seal radially inward of the support structure requires the rotating leaf spring seal to be compressed radially inward against the spring action of a spring section of the rotating leaf spring seal. A third step 506 includes installing a hold down ring within a hook section of the rotating leaf spring seal. In various embodiments, installing the hold down ring requires manipulation of the hook section, such as, for example, bending a free end of the hook section radially inward while urging the hold down ring onto an inner surface of the hook section. A fourth step 508 includes assembling a N+1th rotor (e.g., rotor R8 described above with reference to FIGS. 2A and 2B) to the rotor stack. A fifth step 510 includes inserting and securing a tie shaft to the rotor stack.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A rotating leaf spring seal, comprising:
    a first annular ring configured for positioning against a support structure;
    a hook section having an outer surface configured for sealing engagement with a tie shaft and an inner surface configured for receiving a hold down ring; and
    a spring section disposed between the first annular ring and the hook section,
        wherein the spring section includes a first spring portion and a second spring portion disposed radially inward of the first annular ring,
        wherein the first spring portion includes a second annular ring,
        wherein the second spring portion includes a third annular ring connected to the second annular ring at a flex point that extends circumferentially about a longitudinal axis,
        wherein the second annular ring and the third annular ring are disposed at an angle having a vertex at the flex point,
    wherein the angle defines a range from about thirty degrees to about sixty degrees and
    wherein the second annular ring is substantially parallel to the first annular ring.

2. The rotating leaf spring seal of claim 1, wherein the first annular ring is connected to the second annular ring by an annular wall.

3. The rotating leaf spring seal of claim 1, wherein the outer surface of the hook section includes at least one of a curved surface, a flat surface or an undulating surface configured for sealing engagement with the tie shaft.

4. The rotating leaf spring seal of claim 3, wherein the first annular ring includes an orifice configured to provide a passage for cooling air to flow to a region downstream of the rotating leaf spring seal.

5. The rotating leaf spring seal of claim 3, wherein an anti-rotation peg extends radially outward of the first annular ring and configured to engage with the support structure.

6. The rotating leaf spring seal of claim 3, wherein the outer surface of the hook section is configured for sealing engagement with a wear pad extending radially outward of the tie shaft.

7. The rotating leaf spring seal of claim 6, wherein the support structure is an annular member configured to support an anti-vortex tube.

8. The rotating leaf spring seal of claim 6, wherein the support structure comprises a first arm extending from a first rotor.

9. The rotating leaf spring seal of claim 8, wherein the support structure comprises a second arm extending from a second rotor.

10. A compressor for a gas turbine engine, comprising:
    a first rotor;
    a second rotor disposed downstream of the first rotor; and
    a rotating leaf spring seal disposed between the first rotor and the second rotor, comprising
        a first annular ring configured for positioning against a support structure connected to at least one of the first rotor and the second rotor,
        a hook section having an outer surface configured for sealing engagement with a tie shaft and an inner surface configured for receiving a hold down ring, and
        a spring section disposed between the first annular ring and the hook section.

11. The compressor of claim 10, wherein the spring section includes a first spring portion and a second spring portion disposed radially inward of the first annular ring, the first spring portion including a second annular ring and the second spring portion including a third annular ring connected to the second annular ring at a flex point that extends circumferentially about a longitudinal axis.

12. The compressor of claim 11, wherein the outer surface of the hook section includes at least one of a curved surface, a flat surface or an undulating surface configured for sealing engagement with a wear pad extending radially outward of the tie shaft.

13. A method of assembling a rotating leaf spring seal within a compressor section of a gas turbine engine, comprising:
    assembling a rotor stack having N upstream rotors;
    positioning the rotating leaf spring seal radially inward of a support structure either connected to or extending from an Nth rotor; and
    installing a hold down ring within a hook section of the rotating leaf spring seal.

14. The method of claim 13, wherein positioning the rotating leaf spring seal radially inward of the support structure includes compressing the rotating leaf spring seal radially inward against a spring action of a spring section of the rotating leaf spring seal and installing the hold down ring includes manipulation of a free end of the hook section while urging the hold down ring onto an inner surface of the hook section.

* * * * *